United States Patent [19]
Kemp

[11] 3,771,231
[45] Nov. 13, 1973

[54] VISUAL PAPER MEASURING DEVICE

[76] Inventor: William A. Kemp, 2322 Lincoln St., Oroville, Calif. 95965

[22] Filed: Oct. 21, 1971

[21] Appl. No.: 191,376

[52] U.S. Cl. ................................................ 33/189
[51] Int. Cl. ........................................... G01b 3/00
[58] Field of Search ....................... 33/189, 174 R; 133/1 A, 5

[56] References Cited
UNITED STATES PATENTS

| | | | |
|---|---|---|---|
| 1,407,140 | 2/1922 | Friesen | 133/1 A |
| 1,693,227 | 11/1928 | Ellis | 33/189 X |
| 663,290 | 12/1900 | Miller | 133/6 |
| 766,995 | 8/1904 | Gorin | 133/6 |
| 724,163 | 3/1903 | Cowell | 33/189 |

Primary Examiner—Louis R. Prince
Assistant Examiner—Charles E. Phillips
Attorney—Alexander B. Blair

[57] ABSTRACT

A visual paper measuring device having a paper supporting base and a pair of side walls meeting at a right angle. The side walls are formed of transparent plastic such as plexiglass and at least one of the walls is provided with a plurality of rows of conical apertures which open through the walls with the larger end of the cone directed outwardly. Indicia on the walls adjacent the apertures therethrough indicates the weight of paper and type of measurement being made. In the situation where the paper is to be boxed for office use holes are provided indicating 250 sheets, 500 sheets, 750 sheets, and 1,000 sheets. Measuring the quantity of paper is handled by placing the paper on the base and jogging it to produce a flat surface against the meeting side walls. A sharp pencil point, ballpoint pen point or other marking device is then used to mark the points of separation of the stack following which the paper is packaged.

When it is desired to pad the paper it is marked through a set of holes indicating 100 sheet divisions. After the paper is separated it is placed in a padding device and padded.

1 Claim, 3 Drawing Figures

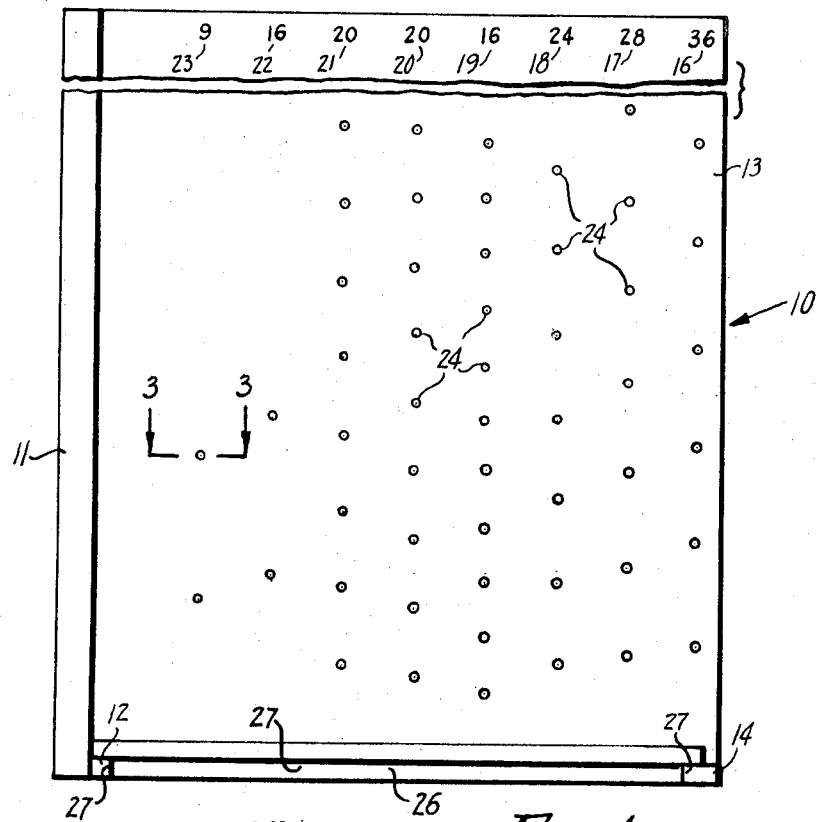
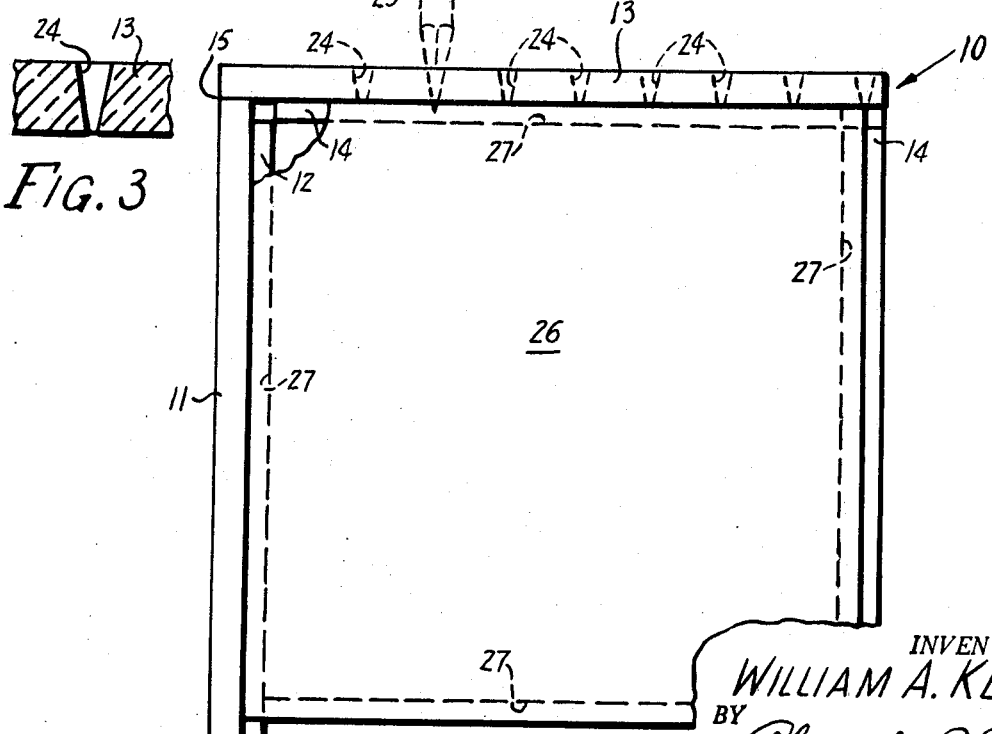

VISUAL PAPER MEASURING DEVICE

BACKGROUND OF THE INVENTION

FIELD OF THE INVENTION

The present invention relates to visual paper measuring devices.

SUMMARY OF THE INVENTION

The device for visually measuring paper includes a base on which the paper rests when being measured and a pair of upstanding transparent side walls secured together to form a 90° angle. A plurality of rows of holes of conical outline open through one of the side walls with the larger end of the opening outwardly. Indicia is used to indicate the weight of the paper being measured such as 16 pound, 20 pound, etc. and separation that is to be used such as 100 sheets, 200 sheets and the like. The device is used by stacking the paper on the base with its edges in contact with the two walls and the edge of the paper is marked through the openings to indicate the points of separation of the pile of paper. Obviously the weight of the paper must be known so that you refer to the right column when marking the paper.

The primary object of the invention is to provide a visual paper measuring device which is inexpensive to manufacture, simple to use and which is completely accurate in its application.

Other objects and advantages will become apparent from the following specification when considered in the light of the attached drawings.

BRIEF DESCRIPTION OF THE DRAWINGS

FIG. 1 is a front elevation of the invention;

FIG. 2 is a top plan view of the invention shown partially broken away and in section for convenience of illustration; and FIG. 3 is an enlarged fragmentary horizontal sectional view taken along the line 3—3 of FIG. 1 looking in the direction of the arrows.

DESCRIPTION OF THE PREFERRED EMBODIMENT

Referring now to the drawing in detail wherein like reference characters indicate like parts throughout the several figures the reference numeral 10 indicates generally a visual paper measuring device constructed in accordance with the invention.

The device 10 includes a transparent plastic generally rectangular side wall 11 having a generally rectangular flange 12 rigidly secured to the lower side thereof and extending inwardly therefrom.

A rear wall 13 is formed of transparent plastic and has a generally rectangular form. A generally rectangular flange 14 is integrally formed on the lower end of the wall 14 for reasons to be assigned. The wall 11 and the wall 13 are positioned perpendicularly to each other and joined at 15 to form a rigid joint.

The wall 13 is provided with a plurality of rows of holes 16, 17, 18, 19, 20, 21, 22 and 23 with each of the rows having indicia indicating the weight of the paper to be measured thereon. The rows of holes 16, 17, 18, 19, 20, 21, 22 and 23 are made up of individual conical holes 24 having the larger end thereof extending outwardly as can be seen in FIG. 3. The holes 24 permit a pencil 25 or other marking device such as a ballpoint pen to be inserted therein to mark a pile of paper engaged against the wall 13. A generally rectangular base 26 is provided with a rabbet 27 along each side edge thereof to engage over the flanges 12, 14 as can be seen in FIGS. 1 and 2. The base 26 may be made of any desired material such as plastic, wood, or the like and is not necessarily transparent. The base 26 is not fastened to the flanges 12, 14 but is loosely supported thereon.

In the use and operation of the invention paper is stacked on the base 26 and the row of holes corresponding to the weight of the paper is selected and a pencil or other marking implement is inserted through the holes 24 to mark the paper indicating the points at which the stack of paper is to be divided up into its individual accurately measured sub-divisions.

Having thus described the preferred embodiment of the invention it should be understood that numerous structural modifications and adaptations may be resorted to without departing from the spirit of the invention.

I claim:

1. A visual paper measuring device comprising a pair of generally rectangular transparent side walls perpendicularly secured together along a side edge of each, a rectangular flange integrally secured to the lower edge of both of said side walls and offset toward each other, a generally rectangular base member loosely supported on said flanges to support a stack of paper to be measured, and a plurality of rows of conical holes formed in one of said walls with the larger portion of said holes on the side of said wall opposite said base member to receive a marking device to separate the paper stack into measured units for packaging.

* * * * *